United States Patent
Franceschini et al.

(10) Patent No.: US 8,176,235 B2
(45) Date of Patent: May 8, 2012

(54) NON-VOLATILE MEMORIES WITH ENHANCED WRITE PERFORMANCE AND ENDURANCE

(75) Inventors: Michele M. Franceschini, Yorktown Heights, NY (US); Ashish Jagmohan, Yorktown Heights, NY (US); Luis A. Lastras-Montano, Yorktown Heights, NY (US); Mayank Sharma, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 12/631,505

(22) Filed: Dec. 4, 2009

(65) Prior Publication Data

US 2011/0138105 A1    Jun. 9, 2011

(51) Int. Cl.
   *G06F 12/00*   (2006.01)
(52) U.S. Cl. ... 711/103; 711/156; 711/158; 365/185.33; 707/813; 707/814; 707/817
(58) Field of Classification Search ................ 711/103, 711/156, 158; 365/185.33; 707/813, 814, 707/817
See application file for complete search history.

(56) References Cited

U.S. PATENT DOCUMENTS

| | | | |
|---|---|---|---|
| 6,157,570 A | 12/2000 | Nachumovsky | |
| 6,725,321 B1 | 4/2004 | Sinclair et al. | |
| 6,788,612 B2 | 9/2004 | Hsu et al. | |
| 6,794,997 B2 | 9/2004 | Sprouse | |
| 6,903,981 B2 | 6/2005 | Futatsuyama et al. | |
| 6,961,890 B2 | 11/2005 | Smith | |
| 6,978,342 B1 | 12/2005 | Estakhri et al. | |
| 7,039,788 B1 | 5/2006 | Chang et al. | |
| 7,080,192 B1 | 7/2006 | Wong | |
| 7,245,556 B1 | 7/2007 | Pinto et al. | |
| 7,315,870 B2 | 1/2008 | Mukaida | |
| 7,340,581 B2 | 3/2008 | Gorobets et al. | |
| 7,382,660 B2 | 6/2008 | Bovino et al. | |
| 7,409,489 B2 | 8/2008 | Sinclair | |
| 7,409,524 B2 | 8/2008 | Safford et al. | |
| 7,441,090 B2 | 10/2008 | Estakhri et al. | |
| 7,450,420 B2 | 11/2008 | Sinclair et al. | |

(Continued)

OTHER PUBLICATIONS

Ashish Jagmohan et al.; "Write Amplification Reduction in NAND Flash through Multi-Write Coding"; storageconference.org/2010/Presentations/Research/S10.Jagmohan.pdf; Jun. 2010, pp. 1-6.

(Continued)

*Primary Examiner* — Stephen Elmore
(74) *Attorney, Agent, or Firm* — Cantor Colburn LLP; Daniel Morris (57) ABSTRACT

Enhanced write performance for non-volatile memories including a memory system that includes a receiver for receiving a data rate of a data sequence to be written to a non-volatile flash memory device. The memory system also includes a physical page selector for selecting a physical address of an invalid previously written memory page from a group of physical addresses of invalid previously written memory pages located on the non-volatile memory device, and for determining if the number of free bits in the invalid previously written memory page at the selected physical address is greater than or equal to the data rate. The memory system also includes a transmitter for outputting the selected physical address of the invalid previously written memory page, the outputting in response to the physical page selector determining that the number of free bits is greater than or equal to the data rate.

25 Claims, 6 Drawing Sheets

U.S. PATENT DOCUMENTS

| | | | |
|---|---|---|---|
| 7,457,909 | B2 | 11/2008 | Di Sena et al. |
| 7,493,442 | B2 | 2/2009 | Wong et al. |
| 7,511,646 | B2 | 3/2009 | Cornwell |
| 7,516,371 | B2 | 4/2009 | Sakaue et al. |
| 7,529,881 | B2 | 5/2009 | Pascucci et al. |
| 7,539,077 | B2 | 5/2009 | Yoon et al. |
| 7,697,325 | B2 | 4/2010 | Sprouse et al. |
| 2003/0037215 | A1 | 2/2003 | Chen |
| 2004/0160343 | A1 | 8/2004 | Sprouse |
| 2006/0282610 | A1 | 12/2006 | Dariel et al. |
| 2007/0033375 | A1 | 2/2007 | Sinclair et al. |
| 2007/0147168 | A1 | 6/2007 | Pinto et al. |
| 2007/0150644 | A1 | 6/2007 | Pinto et al. |
| 2007/0168632 | A1 | 7/2007 | Zeevi et al. |
| 2007/0171714 | A1 | 7/2007 | Wu et al. |
| 2007/0233941 | A1 | 10/2007 | Lee et al. |
| 2007/0233989 | A1 | 10/2007 | Garcia-Arellano et al. |
| 2008/0256352 | A1 | 10/2008 | Chow et al. |
| 2009/0027652 | A1 | 1/2009 | Chang et al. |
| 2009/0055605 | A1 | 2/2009 | Wu et al. |
| 2009/0080249 | A1 | 3/2009 | Sprouse et al. |
| 2009/0125671 | A1 | 5/2009 | Flynn et al. |
| 2009/0150595 | A1 | 6/2009 | Lavan |
| 2009/0150600 | A1 | 6/2009 | Suda |
| 2009/0327590 | A1* | 12/2009 | Moshayedi ............... 711/103 |
| 2009/0327591 | A1* | 12/2009 | Moshayedi ............... 711/103 |
| 2010/0158043 | A1* | 6/2010 | Bodo et al. ............... 370/466 |
| 2010/0281340 | A1 | 11/2010 | Franceschini et al. |
| 2011/0138104 | A1 | 6/2011 | Franceschini et al. |

OTHER PUBLICATIONS

Daewoong, Kang et al.; "Improving the endurance characteristics through boron implant at active edge in 1 G NAND Flash"; IEEE, Apr. 15-19, 2007; pp. 652-653.

"Design of on-chip error correction system for multilevel NOR and NAND flash memories"; F. Sun et al.: IET Circuit Devices Syst., 2007, 1, (3); pp. 241-249.

A. Ben-Aroya; "Competitive Analysis of Flash-Memory Algorithms"; Lecture Notes in Computer Science 4168 (2006) pp. 1-59.

A. Ben-Aroya et al.; "Competitive Analysis of Flash-Memory Algorithms"; ESA 2006; LNCS4168; pp. 100-111.

A. Fiat et al; Generalized "Write-Once" Memories; IEEE Transactions on Information Theory; vol. IT-30, No. 3, May 1984; pp. 470-480.

A. Jiang; On the Generalization of Error-Correcting WOM Codes; in IEEE International Symposium on Information Theory; ISIT 2007, pp. 1391-1395.

A. Jiang et al.; "Floating Codes for Joint Information Storage in Write Asymmetric Memories"; in IEEE International Symposium on Information Theory, ISIT 2007; pp. 1166-1170.

A. Kawaguchi et al.; "A Flash memory Based File System"; pp. 1-10.

C. Heegard; "On the Capacity of Permanent Memory"; IEEE Transactions on Information Theory; vol. IT-31; No. 1; Jan. 1985; pp. 34-42.

C. Heegard et al.; "On the Capacity of Computer Memory with Defects"; IEEE Transactions on Informaiton Theory, vol. IT-29, No. 5, Sep. 1983; pp. 731-739.

D. Dolev et al.; "Correcting Faults in Write Once Memory"; 1984 ACM 0-89791-133-4/84/004/0225; pp. 225-229.

D. Woodhouse; "JFFS: The Journaling Flash File System"; in Ottawa Linux Symposium; pp. 1-12.

E. Yaakobi et al.; "Error Correction Coding for Flash Memories"; Flash Memory Summit, Aug. 2009; pp. 1-17.

E. Yaakobi et al.; "Multidimensional Flash Codes"; arXiv.0901.0702v3 [cs.IT]; Apr. 3, 2009; pp. 1-8.

Eran Gal et al.; "Algorithms and Data Structures for Flash Memories"; ACM Computing Surveys 37, No. 2, (2005); pp. 138-163.

F. Merkx; 09-Womcodes Constructed With Projective Geometries; Traitement du Signal; vol. 1, No. 2-2 (1984); pp. 227-231.

Fang-Wei Fu et al.; "On the Capacity and Error-Correcting Codes of Write-Efficient Memories"; IEEE Transactions on Information Theory; vol. 46; No. 7; Nov. 2000; pp. 2299-2314.

G. Cohen et al.; "Linear Binary Code for Write Once Memories"; IEEE Transactions on Information Theory; vol. IT-32; No. 5; Sep. 1986; pp. 697-700.

Godard et al.; "Evaluation of Design for Reliability Techniques in Embedded Flash Memories"; 2007; IEEE Xplore (978-3-9810801-2-4/DateJul. 2007 EDAA); pp. 1-6.

H. Finucane et al.; "Designing Floating Codes for Expected Performance"; in Communication, Control and Computing; 2008, 46th Annual Allerton Conference on 2008; pp. 1389-1396.

Hu et al.; "Write Amplification Analysis in Flash-Based Solid State Drives"; SYSTOR 2009; pp. 1-13.

IBM; Adding and Wear-Leveling (and Potentially Atomic Journaling) Support for Metadata on FAT12/FAT16/FAT32 File System; IP.com No. IPCOM000175280D; Publication Date: Oct. 7, 2008; pp. 1-3.

Ivaniuk et al.; Detecting Multiple Errors in RAM by Self-Adjusting Output Data Compression, ISSN 1063-7397, Russian Microelectronics 2007; vol. 36, No. 4, pp. 271-277.

J. Fridich et al.; "Steganography via Codes for Memory with Defective Cells"; in 43rd Conference on Coding; Communication and Control 2005; pp. 1-17.

J. Martin Borden et al.; On-Coding for "Stuck-At" Defects; IEEE Transactions on Information Theory; vol. IT-33; No. 5; Sep. 1987; pp. 729-735.

Jai Menon et al.; "An Age Threshold Algorithm for Garbage Collection in Log-Structured Arrays and File Systems"; (Citeseer, 1998); pp. 1-15.

Li-Pin Chang et al.; Real-Time Garbage Collection for Flash-Memory Storage Systems of Real-Time Embedded Systems; ACM Transactions on Embedded Computing Systems; vol. 3, No. 4, Nov. 2004; pp. 837-863.

Li-Pin Change et al.; "A Real-Time Garbage Collection Mechanism for Flash-Memory Storage Systems in Embedded Systems"; ACM Transactions on Embedded Computing Systems (TECS) 3, No. 4 (2004) ; pp. 837-863.

M. Mitzenmacher et al.; "The Power of Two Random Choices: A Survey of Techniques and Results"; pp. 1-60.

Mandavifar et al; "A Nearly Optimal Construction of Flash Codes"; arXiv:0905.1512v1 [cs.IT]; May 10, 2009; pp. 1-5.

R. Krishnamoorthy et al.; "Error Control to Increase the Yield of Semiconductor RAM's"; in Information Theory Workshop at Cornell; the 1989 IEEE/CAM, 1989, 7-3; 1 page.

R. Rivest et al.; How to Reuse a "Write-Once" Memory; Reprinted from Information; vol. 55, Nos. 1-3, Oct./Nov./Dec. 1982 Printed in Belgium; pp. 1-19.

Michele M. Franceschini; U.S. Appl. No. 12/903,695; Filing Date: Oct. 13, 2010; "Multi-Write Endurance and Error Control Coding of Non-Volatile Memories".

* cited by examiner

NON-VOLATILE MEMORIES WITH ENHANCED WRITE PERFORMANCE AND ENDURANCE

BACKGROUND

This invention relates generally to computer memory, and more specifically to non-volatile memories with enhanced write performance and endurance.

Phase-change memories (PCMs) and flash memories are examples of non-volatile memories with limited endurance (also referred to as a "limited life"). Such memories have limited endurance in the sense that after undergoing a number of writing cycles (RESET cycles for PCM, program/erase cycles for flash memory), the memory cells wear out and can no longer reliably store information.

One characteristic of contemporary not-and (NAND) flash memory devices is that they do not support page erase. The absence of page erases implies that once a page is written, it is not rewritten until the entire block (e.g. made up of sixty-four pages) is erased. Conventional memory systems having NAND flash memory devices employ log-structured file systems, where physical page addresses are different from logical page addresses, and a mapping of logical to physical page addresses is maintained. When a write to a logical address first appears it is allocated to a free (erased) page and the logical-to-physical mapping is stored. Subsequently, if the data at the logical address is to be updated, a new erased block is used for writing the data, the logical-to-physical map corresponding to the logical address is updated, and the earlier physical page is marked as invalid.

In order to avoid running out of writable pages, a periodic process, referred to as "garbage collection" is performed. During garbage collection, the valid pages from one or more blocks are moved to free pages and the blocks are then erased. Since this process involves freeing up invalid pages, it allows the memory device to regain previously programmed (or written) pages. However, the process of garbage collection generates additional writes (i.e. writes which are not directly used for writing data corresponding to a logical address to memory). These extra writes can increase system latency (because, in general, NAND programming operations have a high latency) and can reduce system endurance (because a NAND cell wears out after undergoing a limited number of program-erase cycles).

SUMMARY

An exemplary embodiment is a memory system that includes a receiver for receiving a data rate of a data sequence to be written to a non-volatile memory device, the data rate specifying a number of bits in the data sequence. The memory system also includes a physical page selector for: selecting a physical address of an invalid previously written memory page from a group of physical addresses of invalid previously written memory pages located on the non-volatile memory device, the invalid previously written memory page at the selected physical address having a number of free bits; and for determining if the number of free bits is greater than or equal to the data rate. The memory system also includes a transmitter for outputting the selected physical address of the invalid previously written memory page, the outputting in response to the physical page selector determining that the number of free bits is greater than or equal to the data rate.

Another exemplary embodiment is a computer implemented method for selecting a physical page to write to in a memory system. The method includes receiving a data rate of a data sequence to be written to a non-volatile memory device, the data rate specifying a number of bits in the data sequence. A physical address of an invalid previously written memory page is selected from a group of physical addresses of invalid previously written memory pages located on the non-volatile memory device. The invalid previously written memory page at the selected physical address has a number of free bits. It is determined if the number of free bits is greater than or equal to the data rate. The selected physical address of the invalid previously written memory page is output in response to determining that that the number of free bits is greater than or equal to the data rate.

An additional exemplary embodiment is a computer implemented method for erasing memory blocks in a memory system. The method includes receiving a block erasure request specifying a not-and (NAND) flash memory device, the NAND flash memory device including one or more memory blocks that are candidates for erasure. A memory block to be erased is selected from the one or more memory blocks that are candidates for erasure. The selecting is in response to a number of memory pages containing valid data in a candidate memory block, to a number of free bits in the candidate memory block, and to a number of writes left in the candidate memory block. An erasure of the selected memory block is initiated.

A further exemplary embodiment is a memory system that includes: a receiver for receiving a data sequence to be written to a non-volatile memory device, and for receiving a logical address associated with the data sequence; a physical page selector for selecting a physical page on the non-volatile memory device to be written with the data sequence, the selected physical page having a number of free bits; a multi-write code selector for selecting a write code in response to the number of free bits in the selected physical page and to the data sequence; and a device writer for reading contents of the selected physical page, generating a write sequence that is consistent with the contents of the selected physical page, and writing the write sequence to the selected physical page, the reading, generating and writing performed in response to the selected physical page being a previously written memory page.

Additional features and advantages are realized through the techniques of the present embodiment. Other embodiments and aspects are described herein and are considered a part of the claimed invention. For a better understanding of the invention with the advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Exemplary embodiments of the present invention are directed to a memory system in which pages in not-and (NAND) flash devices can be written multiple times using multi-write codes. Exemplary embodiments perform garbage collection in a manner that reduces write amplification and hence increases system performance (in terms of total write latency) and device endurance when compared to conventional garbage collection processes. Aspects of exemplary embodiments include write-page selection, garbage collection algorithm design, and the use of data structures that support the efficient implementation of write-page selection and garbage collection.

Using appropriate codes, data can be written to a previously programmed (also referred to herein as "previously written") flash page without requiring a block erase. This is done by producing a codeword which is consistent with the previous page content i.e. it does not require any cell (or requires at most a few cells) to be programmed to a level which it cannot attain. In an exemplary embodiment, a memory cache is utilized to store the number of free bits i.e. the number of bits that can be written to a previously programmed flash page without requiring a block erase. In an exemplary embodiment the flash device is a single-level cell (SLC) NAND Flash device, where each cell can store one bit of data, since each cell can take on one of two physical charge states. In this case, the number of free bits is equal to the number of cells in a page that have not been programmed and are in an erased state, in a non-erased, or invalid, memory page. These free bits can be programmed in a subsequent write without requiring a block erase.

In another exemplary embodiment the flash device is a multi-level cell (MLC) NAND flash device, where each cell can store multiple bits of data, since each cell can take on more than two physical charge states. Once a cell is programmed to a given level, it can subsequently be reprogrammed to a subset of other levels without a block erase (i.e., only some of the other levels are attainable without a block erase). In this case, the number of free bits is equal to the number of bits that can be written into a page on a rewrite without requiring a block erase i.e. the number of bits that can be written such that the new page content is consistent with the old page content.

The term "invalid previously written memory page" refers to a non-erased memory page (some of its bits have been programmed) in physical memory that is not currently correlated to a logical address. The number of times that an invalid previously written memory page may be rewritten may not exceed a maximum number of rewrites (based, e.g., on memory device specifications, age of memory device, the error-control code used etc.).

In an exemplary embodiment, the data to be written is compressed using lossless compression before it is written. Multi-write coding may lead to an expansion in the data length, and code selection can thus be adapted to the compression to ensure that the coded data occupies a desired, pre-specified length (such as a page size). Compression prior to writing the data is optional; if compression is not used, the code can be selected so as to expand data by a desired expansion factor. The expansion factor can be adapted to the number of free-bits in one or more pages.

In an exemplary embodiment, a memory cache is utilized to store the number of non-programmed bits (or "free bits") in non-erased pages that are nevertheless writable (i.e. they contain invalid data and have not exceeded a maximum number of rewrites). While writing, the data to be written is first compressed using lossless compression. Next, a subset of the pages from the writable page cache is selected as candidates for rewriting. Based on the data rate (i.e., the number of bits in the compressed data), the statistical history of compression rates seen by the system, and the block characteristics of each candidate page, a page is selected for rewrite. If all candidate pages are unsuitable, a free (erased) page is selected instead. For rewriting a previously programmed page (i.e., a previously written page), the data sequence is mapped onto one of a plurality of possible representative sequences, where the selected representative sequence is consistent with previously programmed cells. Garbage collection is performed by selecting a block to free based on the number of valid pages in the block, the total number of possible rewrites remaining to the block, and as a function of the total erased bits in the block.

Figure 1:
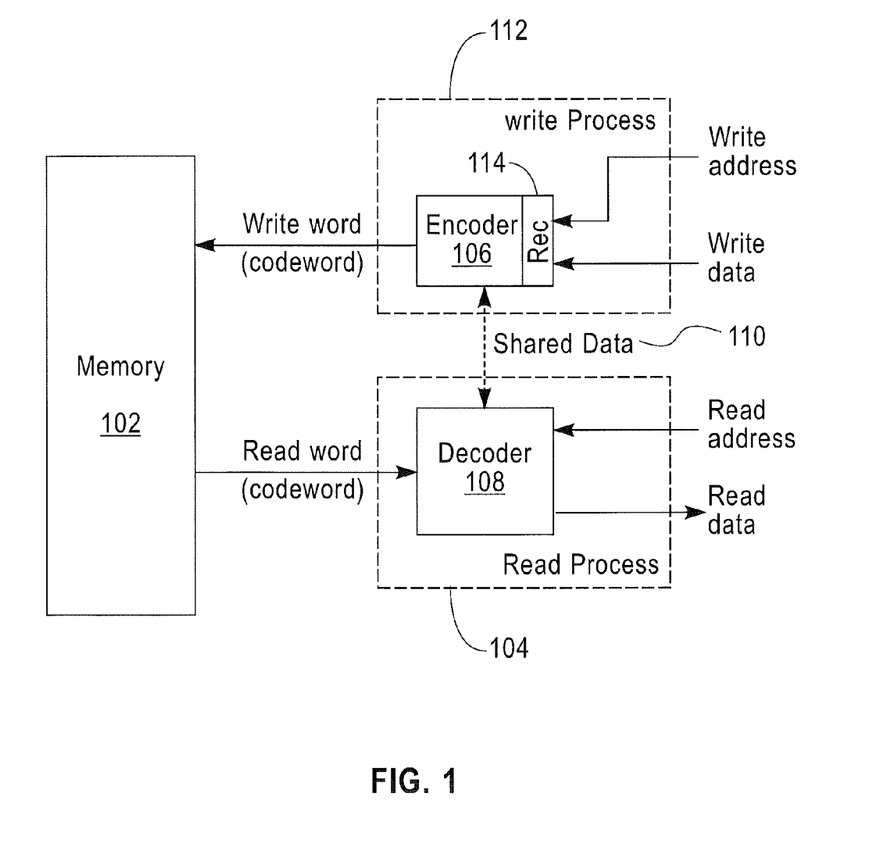
FIG. 1 illustrates a block diagram of a system for storing and retrieving data in a memory system that may be implemented by an exemplary embodiment.

FIG. 1 illustrates a block diagram of a system for storing and retrieving data in a memory that may be implemented by exemplary embodiments. The system depicted in FIG. 1 includes a memory 102 having blocks of memory cells (each block made up of pages), an encoder for receiving write data and generating a write word for storage in the memory cells, a decoder 108 for receiving a read word from the memory and generating read data, and shared data 110 storing characteristics of the stored data for use by both the encoder 106 and the decoder 108. In an exemplary embodiment, the encoder 106 and shared data 110 are utilized by a write process 112, and the decoder 108 and shared data 110 are utilized by a read process 104.

In an exemplary embodiment the encoder 106, decoder 108, and shared data 110 are located on a memory controller or memory module. In an alternate exemplary embodiment, the encoder 106, decoder 108, and shared data 110 are located on a memory device. The shared data 110 may be stored in a register or any other storage location that is accessible by both the encoder 106 and the decoder 108.

In an exemplary embodiment, the memory 102 is implemented by NAND flash memory devices or other non-volatile memory devices.

Inputs to the encoder 106 depicted in FIG. 1 include the of the page to be written (also referred to herein as a "write address"), and the data to be written to the page. In an exemplary embodiment, the inputs are received via a receiver (e.g., located on a memory device, memory module, memory controller, or other location). The receiver may be implemented in a variety of manners including hardware for receiving the inputs and/or a storage location (e.g., a register) where the inputs are located.

An input to the decoder 108 depicted in FIG. 1 includes the address of the memory location (e.g., a page) to be read. As shown in FIG. 1, the inputs are received via a receiver 114 located on the encoder 106. In an exemplary embodiment, the input is received via a receiver (e.g., located on a memory device, memory module, memory controller, or other location). The receiver may be implemented in a variety of manners including hardware for receiving the inputs and/or a storage location (e.g., a register) where the inputs are located.

An output from the decoder 108 depicted in FIG. 1 includes the read data. In an exemplary embodiment, the outputting is by a transmitter (e.g., located on a memory device, memory module, memory controller, or other location). The transmitter may be implemented in a variety of manners including hardware for transmitting the output and a storage location or register where the outputs are stored.

Figure 2:
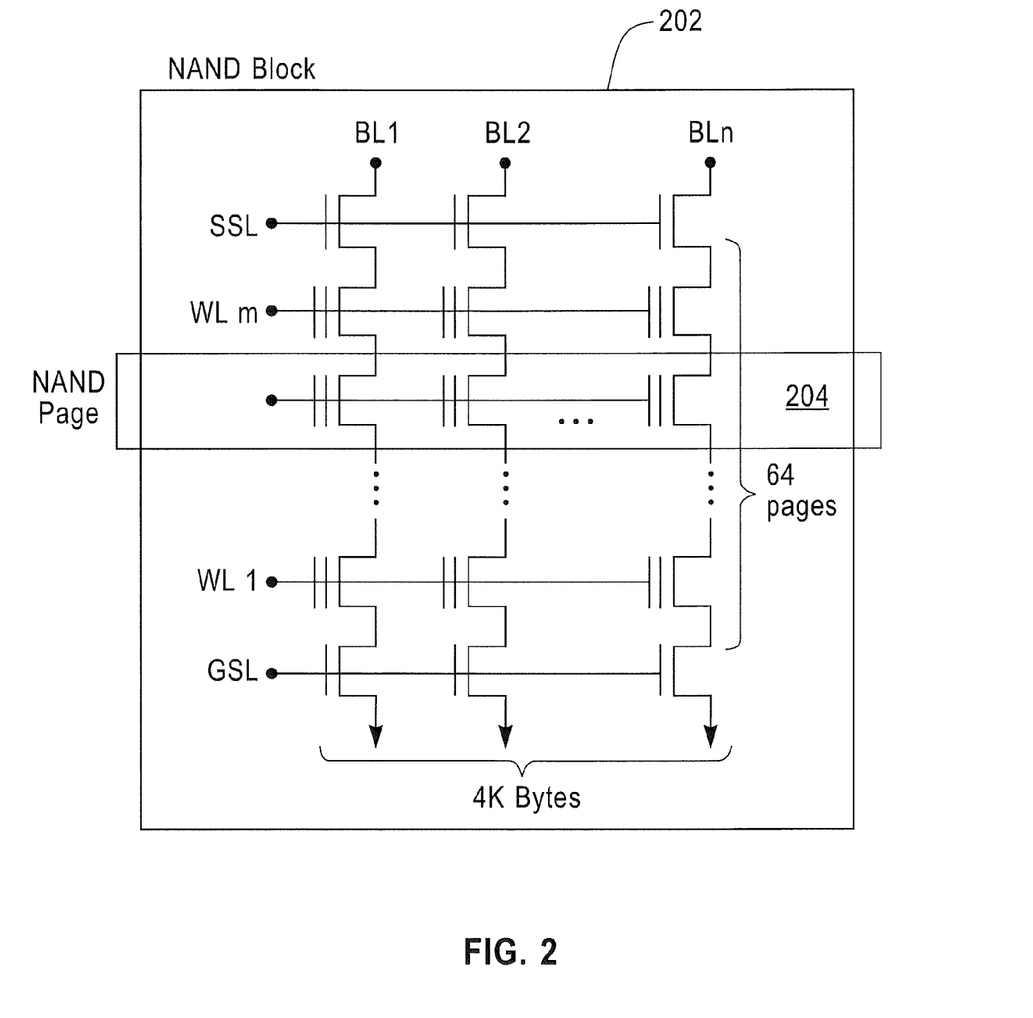
FIG. 2 illustrates a block diagram of a not-and (NAND) flash memory that may be implemented by an exemplary embodiment.

FIG. 2 illustrates a block diagram of a NAND flash memory (an exemplary of a non-volatile memory device) that may be implemented by an exemplary embodiment. The NAND block 202 depicted in FIG. 2 includes a plurality of pages 204, with each page made up of a plurality of memory cells. In the example depicted in FIG. 2, sixty-four pages make up the NAND block 202, however other numbers of pages may also make up one block of NAND memory (e.g., one hundred and twenty eight, and thirty two). In the example depicted in FIG. 2, each page is made up of thirty four thousand five hundred and twelve memory cells (of which 4096*8 cells are designated as a 4 Kilobyte (KB) data storage area, and the rest constitute a spare area), however other numbers of memory cells may make up one page of NAND memory (e.g., the data storage area may be 2 KB or 8 KB). FIG. 2 includes a plurality of bit lines (denoted "BL1", "BL2", "BLn"), a plurality of word lines (denoted "WL1" and "WLm"), a ground selection line (GSL), and a source selection line (SSL). Additionally, for an MLC device, each page may consist of a given bitplane from a row of cells. For example, one page may consist of the least significant bits of a row of cells, while another may consist of the most significant bits of a row of cells.

In a typical flash device, a mapping between physical and logical block addresses is maintained in a memory controller. Given a logical address and data for a write, the controller selects an erased physical page to write the data onto and records the logical-to-physical mapping. A typical example is the use of a log-based file system where the physical page is the next erased page in the block to which the last logical page was written to, wherein the pages are sequenced, for example on the basis of proximity to the GSL.

In NAND flash memory, pages are the smallest write units and blocks are the smallest erase units. Once a memory cell is programmed (e.g., in an SLC device, changed from a "1" to a "0"), it cannot be changed until the entire block is erased. In an exemplary embodiment, erasing results in all memory cells in the block having a value of "1". Because it is a relatively costly operation (e.g., taking two about two milliseconds of time in some implementations and reducing the remaining useful life of the erased memory cells by at least one write), block erasing is generally performed as infrequently as possible. Allowing multiple writes to a page between block erasures is one way of decreasing the frequency of block erasures. Multiple writes to a page may be performed by ensuring that in each write, the data is encoded into a codeword which is consistent with the previous contents of the cell. Consistency implies that the target program level for each cell is attainable without an erase, or that at most only a small number of cells cannot attain their respective target programmed levels (the erroneous data in such cells can subsequently be corrected by the use of error-control coding). In an exemplary embodiment, the NAND flash memory has two-level cells (called single-level cell or "SLC" NAND flash, since there is only a single programmed level), and once a memory cell is programmed (e.g., changed from a "1" to a "0"), it cannot be changed until the entire block is erased. In this case, consistency implies that in a rewrite only erased cells need to be programmed and that programmed cells never need to be erased.

In another exemplary embodiment, the NAND flash memory has multi-level cells supporting more than two-levels (called multi-level cell or "MLC" NAND flash). Once a cell is programmed to a non-erased level, it can only be reprogrammed to a strict subset of possible levels without erasure. For example, an MLC memory may consist of cells capable of storing four levels. Each of the four levels may be denoted by a two-bit string, say, levels {11, 10, 01, 00} in order of increasing floating-gate charge, where the level "11" represents the erased state. A cell programmed with level "01" may be reprogrammed to levels "01" or "00" without requiring erasure; however, if it needs to be reprogrammed to level "11" or level "10" a block erase is required. In this case, consistency implies that the code word does not have a cell-level in a position which cannot be reached without erasure from the previously programmed cell-level, or at most a small number of such cell positions exist which can be taken care of by the error-control code conventionally used on the Flash page. Multi-write coding may be accomplished by the use of a partition-based code wherein the partition index is selected based on the data vector, and a word is selected from the partition, which is consistent with the previous page content. In addition, the multiple write codeword may be selected to minimize the additional wear caused in each write. Additionally, a generated codeword may satisfy other constraints to allow future writes on the page before the next erasure. Codewords for MLC NAND flash are described herein and in U.S. patent application Ser. No. 12/631,470, entitled "MULTI-WRITE CODING OF NON-VOLATILE MEMORIES" of common assignment herewith, and herein incorporated by reference in its entirety.

Figure 3:
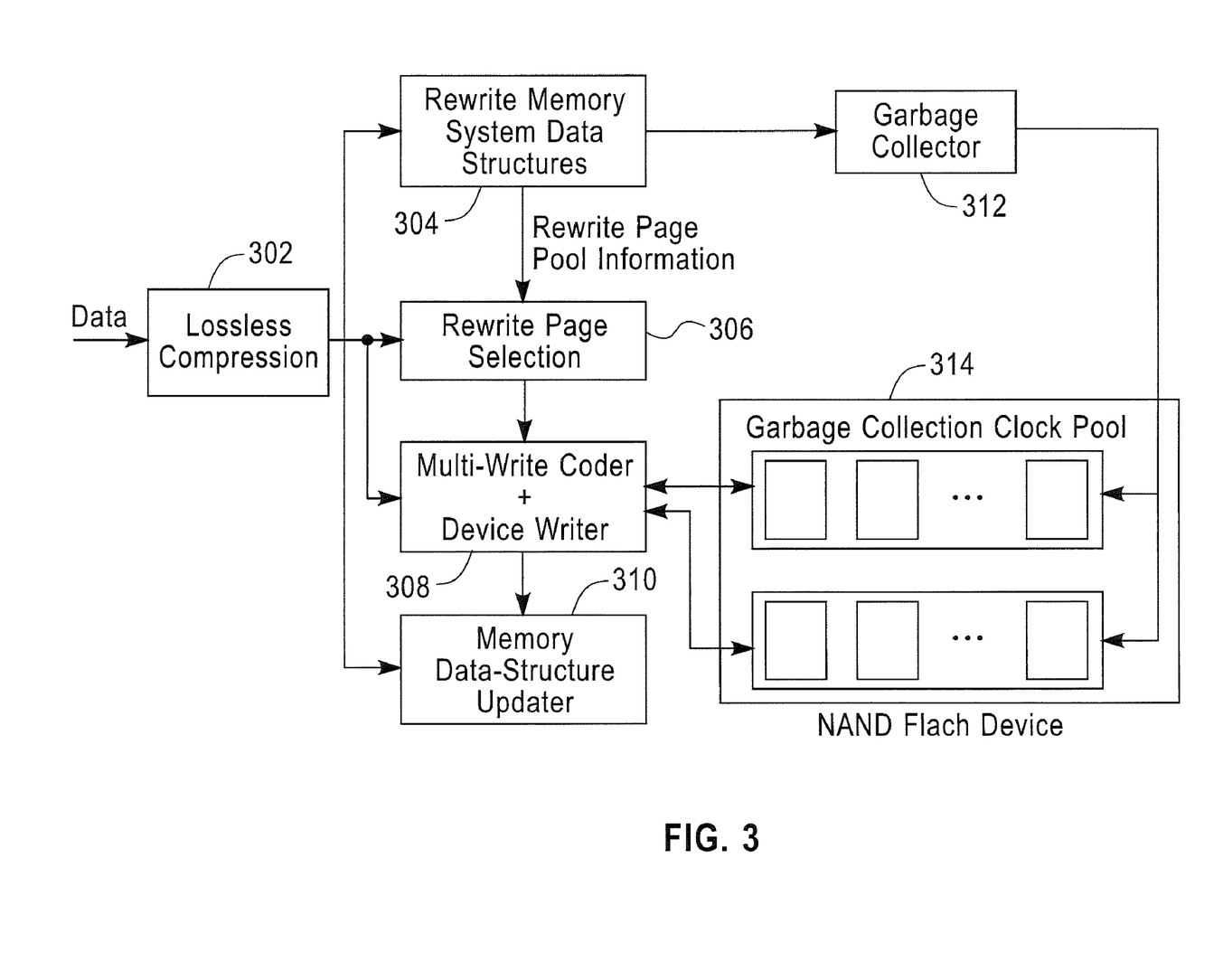
FIG. 3 illustrates a block diagram of a memory system that may be implemented by an exemplary embodiment for storing data in a NAND flash memory device where pages can be rewritten without block erasures.

FIG. 3 illustrates a block diagram of a memory system that may be implemented by an exemplary embodiment for storing data in a NAND flash memory device where pages can be rewritten without block erasures. In an exemplary embodiment, all or portions of the blocks depicted in FIG. 3 (except for the memory device 314) are located in (or performed by) the encoder 106. As depicted in FIG. 3, the data to be written is optionally compressed by a compressor, such as lossless compressor 302. The compressed data rate (the number of bits in the compressed data) is then used to select a previously programmed page currently storing invalidated data (also referred to herein as an "invalid page") to rewrite the current data to.

As described herein, a physical page in memory can have a status of erased, valid, and invalid. As used herein, a status of "erased" refers to a page that is in an erased state (i.e., the last access to the page was an erase). An erased page has no programmed cells (i.e., all bits have the value of "1") and has not been written to (programmed) since the last erasure. As used herein, a status of "valid" refers to a page that currently contains valid data. A valid page contains data associated with one or more programmed cells, and is currently associated with a logical address. As used herein, a status of "invalid" refers to a page that has been previously written to (programmed) since it was last erased. An invalid page is no longer associated with a logical address and contains previously stored data associated with one or more programmed cells. An invalid page is a candidate for being rewritten.

A rewrite page selection processor 306 utilizes several rewrite memory system data structures 304 that store information about each block and page in the memory device 314 in a manner that allows computationally efficient selection of a rewrite page. Such information includes a subset of memory device pages that are in a programmed state but contain invalid data (i.e., invalid pages), and are currently designated as rewritable (i.e. they can be reprogrammed without requiring a block erase). If the rewrite page selection processor 306 finds a non-erased (invalid) page to rewrite to, then a coder and device writer processor 308 uses multi-write codes to rewrite the selected page without requiring block erases. If such a page is not found, the coder and device writer processor 308 write to a currently erased page. Subsequently, the coder and device writer processor 308 updates the rewrite data structures using a memory data-structure updater 310. As used herein, the term "multi-write code selector" refers to the coder portion of the coder and device writer processor 308, and the term "device writer" refers to the device writer portion of the coder and device writer processor 308.

The system depicted in FIG. 3 periodically performs garbage collection using a garbage collector processor 312 in which blocks to be erased are selected from a garbage collection block pool in the memory device 314. The valid data pages from these blocks are rewritten to other pages in memory (e.g., in the memory device) before the blocks are erased.

Figure 4:
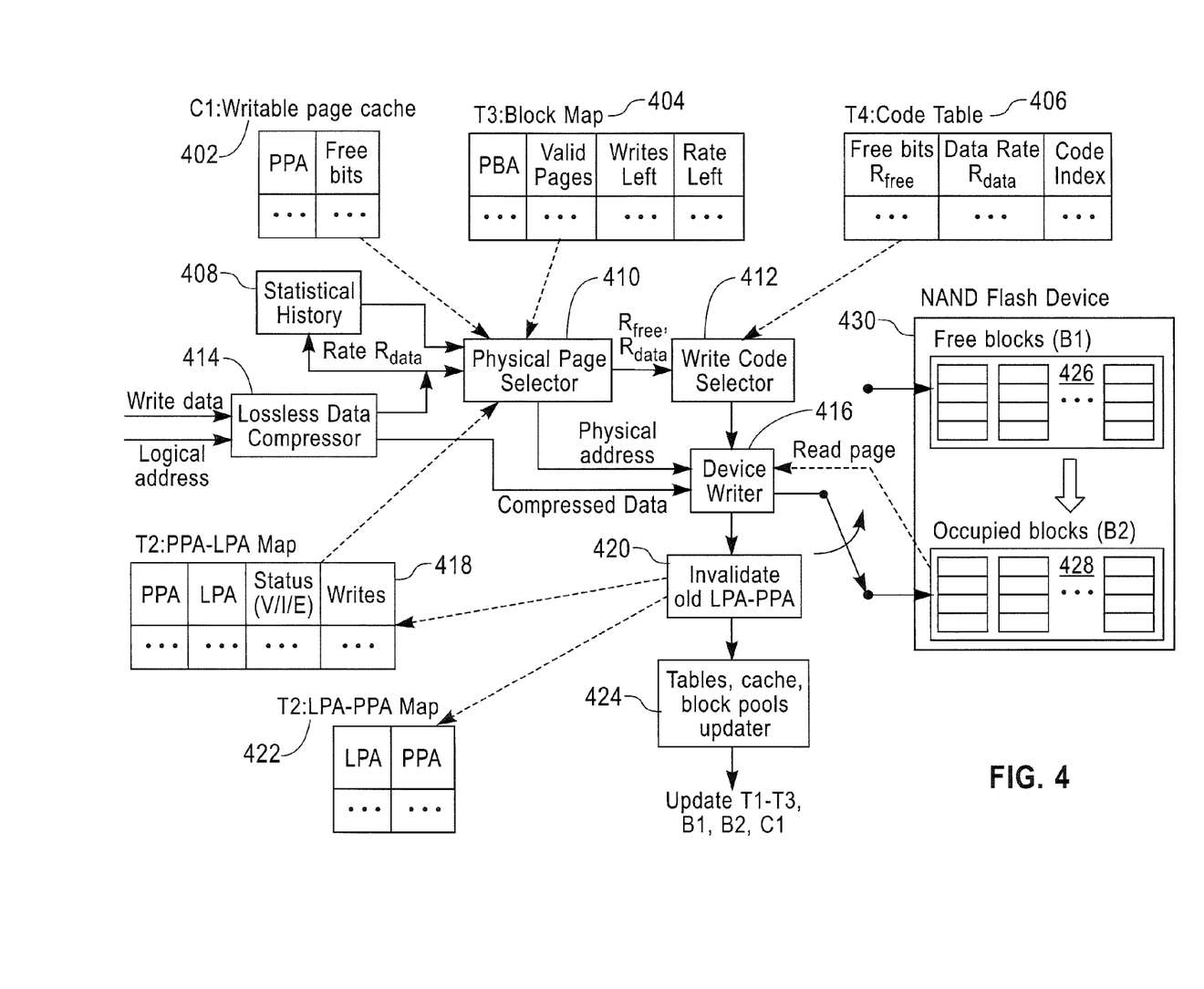
FIG. 4 illustrates a block diagram of a memory system for performing multiple writes to a NAND flash memory device that may be implemented by an exemplary embodiment.

FIG. 4 illustrates a block diagram of a memory system for performing multiple writes to a NAND flash memory device that may be implemented by an exemplary embodiment. In an exemplary embodiment, all or portions of the blocks depicted in FIG. 4 (except for the memory device 430) are located in (or performed by) the encoder 106. Inputs to the system depicted in FIG. 4 include a logical write address and the data to be written, both are input to a data compressor 414. In the embodiment depicted in FIG. 4, the system maintains state information in the following look-up tables (an example of the rewrite memory system data structures 304 of FIG. 3).

T1: logical page address-physical page address (LPA-PPA) map 422, which may be stored at least partially in volatile memory (such as DRAM) and provides a mapping from a LPA to a PPA.

T2: PPA-LPA map 418 is the inverse map of the LPA-PPA map 422. The PPA-LPA map 418 lists for each PPA: a LPA, the status of the physical page, and the number of writes that have been made to the physical page. The status of the physical page can be valid (i.e. the page contains valid data), invalid (i.e., the page has been programmed at last once but contains invalid data) or erased (i.e., the page is in erase state). The PPA-LPA map 418 or table can be stored in volatile memory (such as DRAM) during operation, or it may be stored only on non-volatile memory (such as flash memory).

T3: block map 404 lists for each physical block address (PBA), the number of valid pages and invalid pages in the block, the total number of page writes that can be made to the block, and the total number of free bits left on the block.

T4: code table 406 lists the index of the multi-write code to be used for a given number of free bits in a page $R_{free}$ and a given number of data bits to be rewritten onto the page ($R_{data}$).

C1: writable page cache 402 is a memory cache (e.g., a DRAM) which stores PPAs corresponding to some previously programmed but currently invalid pages, and for each such PPA the number of free bits in the physical page. In an exemplary embodiment, the writable page cache 402 is searched during the write process and the physical page selector 410 selects a physical address of an invalid previously written memory page from the group of physical address of invalid previously written memory pages located in the writable page cache 402.

B1: free block pool 426 includes blocks in the memory device 430 which have at least one erased page. In an exemplary embodiment, the indices of blocks in the free block pool 426 (referred to herein as free blocks) may be stored in a first in first out (FIFO) queue to allow a wait period after erasure, this technique may lead to an improvement in retention.

B2: occupied block pool 428 includes blocks in the memory device 430 that have all of their pages programmed (valid or invalid). The blocks in the occupied block pool 428 (referred to herein as occupied blocks) are candidates for garbage collection and may be stored in a FIFO queue.

In an exemplary embodiment, the data to be written is losslessly compressed by the lossless data compressor 414. The rate of compression (e.g., the data rate) is sent to a physical page selector 410 (implemented, for example, by the rewrite page selection processor 306) which selects the physical page to write the data on to, as a function of the data rate, a statistical history 408 of past compression rates, the PPA-LPA map 418 and the block map 404. The physical page selector 410 selects a physical address of one of the previously programmed, currently invalid PPAs from the writable page cache 402, or selects a physical address of one of the free blocks to write to. In the case where a previously programmed page from an occupied block is selected (i.e., the physical page selector selects a physical address of an invalid previously written memory page), a write code selector 412 (implemented, for example, by the coder and device writer processor 308) uses $R_{free}$ and $R_{data}$ to select an appropriate code index from the code table 406. In an exemplary embodiment, the code table 406 is indexed by two sets of discrete data rate ranges. Depending on the rate range in which $R_{data}$ lies, and the range in which $R_{free}$ lies, an appropriate code index is selected from the code table 406.

The physical address and the compressed data are then sent to a device writer 416 (implemented, for example, by the code and device writer processor 308). In the case where physical address corresponds to an erased page, the device writer 416 simply programs the page with the data. In an alternate embodiment, the device writer 416 transforms the data into a form that minimizes the number of programmed cells for an SLC device, or the wear cost for an MLC device, prior to writing the data onto the memory device 430. In the case where the page is previously programmed (i.e., where the physical page selector selected a physical address of an invalid previously written memory page), the device writer 416 first reads the page and then selects a code (from one or more acceptable codes) to represent the data sequence. The selected code includes a code sequence which is consistent with the data read from the device. This ensures that the current data can be rewritten onto the previously programmed page. The device writer 416 then proceeds to program this data pattern on to the memory page. If the write results in the last erased page of a block being written to, the block is moved to the occupied blocks 516 (e.g., to an occupied block queue).

Subsequently, an invalidation process 420 to invalidate the old LPA-PPA association is performed (e.g., by the memory data-structure updater 310). In an exemplary embodiment, the old LPA-PPA map 422 is updated, and the old PPA corresponding to the LPA is invalidated in the PPA-LPA map 418. Next, the tables (e.g., LPA-PPA map 422, PPA-LPA map 418, and block map 404), the writable page cache 402, and the block pools (e.g., free block pool 426 and occupied block pool 428) are updated by an updater 424 (implemented, for example, by the memory data-structure updater 310). In an exemplary embodiment, this includes updating the writable page cache 402 with the invalidated page information based on the number of free bits in the page, the number of page writes, the current contents of the cache, and the number of valid pages in the block of the invalidated page. In an exemplary embodiment a probabilistic mechanism is used for updating the writable page cache, with pages with lesser free bits having a lower probability of being cached. In another exemplary embodiment, the page information is cached if the number of free bits in the page is larger than the number of free bits in one or more cached pages. In another embodiment the page is cached only if the number of valid pages in its block exceed a pre-determined threshold. In an exemplary embodiment, if a page needs to be removed from the cache in order to make space for the new page, the page with the least number of free bits is removed. In another embodiment, the page with the most writes is selected for removal. In another embodiment, the removal is probabilistic with probability weights assigned based on the number of free bits and the number of writes. Finally, the statistical history 408 is updated with the new compression rate. In another embodiment multiple pages are written per logical address; this improves the endurance performance of the method.

Figure 5:
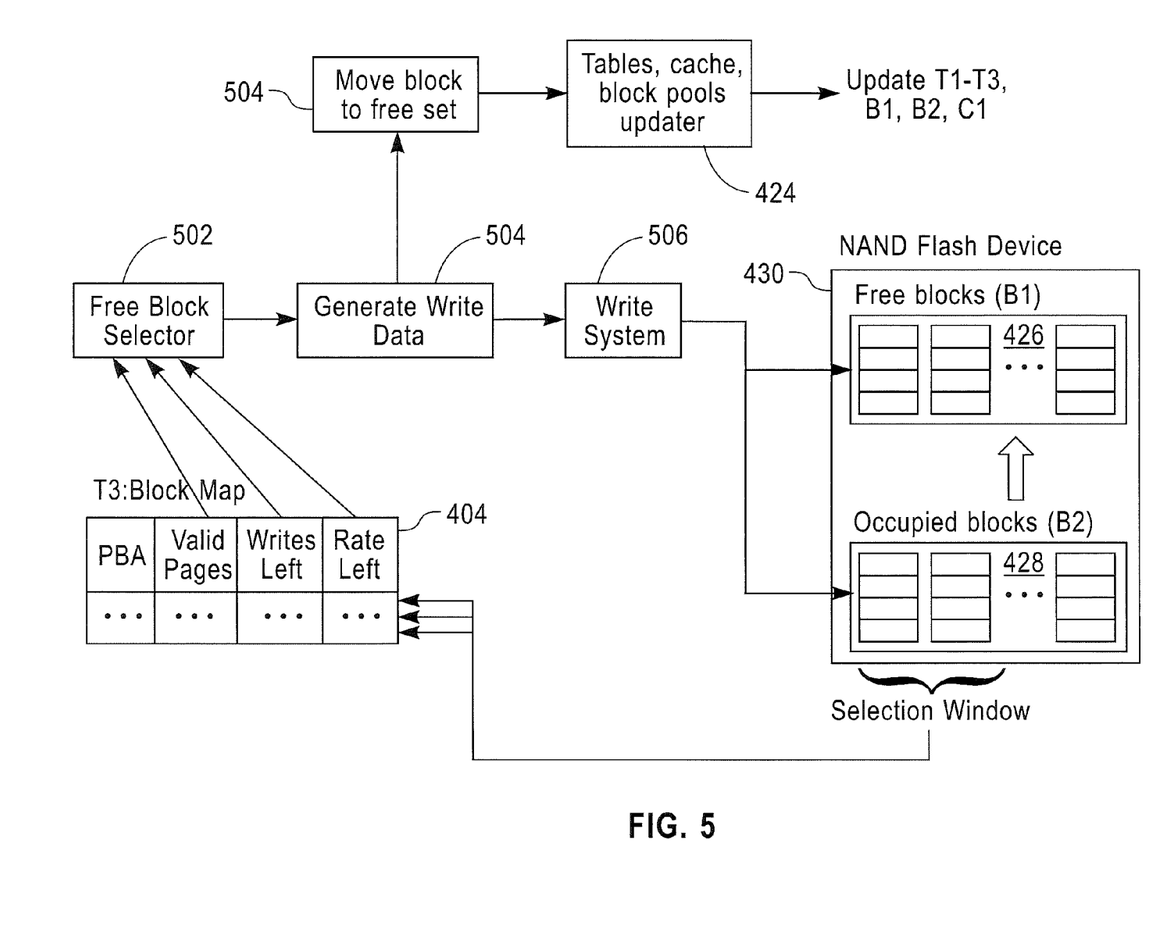
FIG. 5 illustrates a block diagram of a garbage collection process for a multiple write memory system that may be implemented by an exemplary embodiment.

FIG. 5 is a block diagram of a garbage collection process (implemented, for example, by the garbage collector processor 312) for a multiple write memory system that may be implemented by an exemplary embodiment. In an exemplary embodiment, the processing depicted in FIG. 5 is performed by the encoder 106. In an alternate exemplary embodiment, the processing depicted in FIG. 5 is performed by a memory controller. In an exemplary embodiment, garbage collection is performed in response to a block erasure request. In an exemplary embodiment, a block erasure request is generated when the system is in a non-busy state (i.e., the memory resources are not busy performing another task such as a data read or a data write). In another exemplary embodiment, a block erasure request is generated whenever the number of blocks in the free block pool 426 decreases below a pre-specified threshold. In an exemplary embodiment, the next block to be freed is restricted to a set of oldest blocks in the occupied block pool 428.

In an exemplary embodiment, block map entries in the block map 404 are accessed by a free block selector 502 which selects a block to be freed (i.e., erased) from the occupied block pool 428 based on factors such as, but not limited to, the number of valid pages in the block, the total number of page writes that have been done in the block, and the number of free bits in the block. As used herein, the term "memory blocks that are candidates for erasure" refers to the memory blocks that are considered by the free block selector 502 when deciding which block to be freed. Also as used herein, the term "candidate memory block" refers to one of the memory blocks that is a candidate for erasure. In an exemplary embodiment, the memory blocks that are candidates for erasure include the memory blocks in the occupied block pool 428 or other location rIn an exemplary embodiment, if one block has a number of valid pages that is less than all of the other blocks by more than a pre-specified threshold T1, then that block is selected as the block to be freed. Otherwise, the number of writes left in all of the candidate blocks within T1 of this block are compared. If one block has a number of writes which is less than all other blocks by more than a pre-specified threshold T2, then that block is selected as the block to be freed. Otherwise, the block with the least free bits left of all blocks in the intersection of these sets is used as the block to be freed. This is just one way of selecting which block to erase next, and other manners of selection may also be implemented.

In an exemplary embodiment, selection criteria for selecting the next block for erasure is directed to minimizing the number of valid pages in the block in order to reduce immediate write amplification caused by the block erase. An exemplary embodiment of the selection criteria is directed to selecting a block with a minimal number (e.g., within a specified threshold) of programmed cells in the valid pages to reduce the amount of programming required to copy the valid pages to another block. An exemplary embodiment of the selection criteria is directed to minimizing the amount of free bits lost (e.g., bits lost within a specified threshold) in order to reduce future amplification. In this embodiment, the number of writable pages and/or the total writable block rate (computed as a product of the number of rewrites possible on the pages in the block and the average rate for each page write that can be achieved assuming equal size writes) may be taken into consideration when selecting the next block to be erased. In an exemplary embodiment, the selection process takes into account spatial and temporal information. Each page is assigned a likelihood of being updated in the near-future (defined as a constant number of subsequent writes) based on the spatial and temporal pattern of the last few logical addresses. A block with the lowest likelihood of being updated in the near future is selected for erasure. In another embodiment, a combination of the above factors is used to make the determination.

In an exemplary embodiment, a subset of the occupied blocks 428 are selected as candidate memory blocks (e.g., the one hundred blocks written to the longest time ago, etc.) and the free block selector 502 selects a next block to erase from the memory blocks that are candidates for erasure (shown in FIG. 5 as the "selection window"). Once a memory block is selected for erasure, the erasure of the memory block is initiated. The process of erasing the memory block starts at block 504, where write data is generated for any valid pages in the selected block and this write data is sent to a write system 506, such as the write system depicted in FIG. 4, for writing the valid pages of data to new blocks. Once the write data has been generated, at block 504, block 508 is performed to erase the contents of the block and to move the selected block to the free block pool 426. Once the erasure of the selected memory block has been completed, the updater 424 updates all of the tables, cache and block pools to indicate that the selected block is now an erased block in the free block pool 426. Note that the writing of valid data might induce more garbage collection steps (since a free block may move to the occupied block pool 428 as a result of these writes.)

Figure 6:
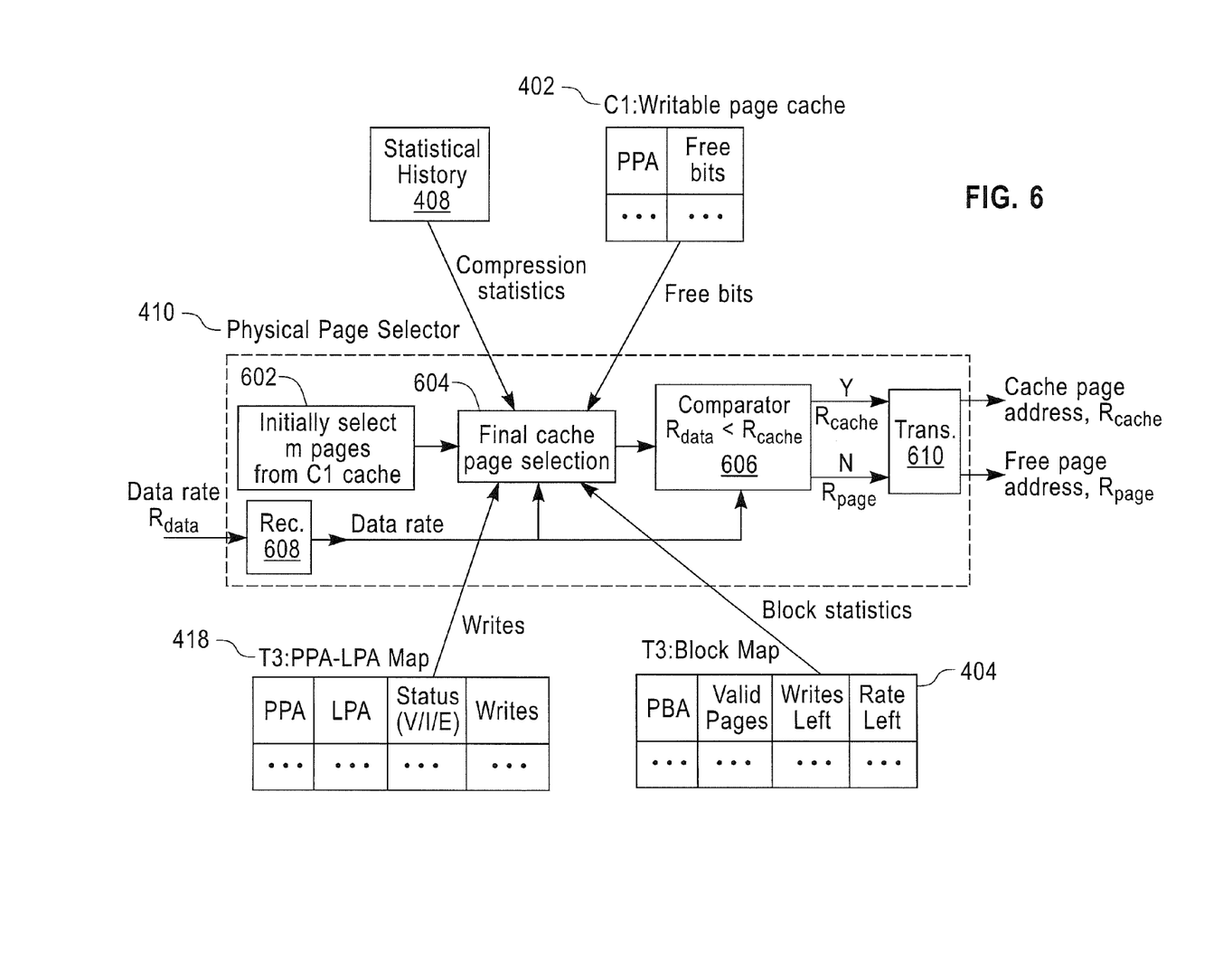
FIG. 6 illustrates a block diagram of a physical write page selection process for a multiple write memory system that may be implemented by an exemplary embodiment.

FIG. 6 illustrates a block diagram of the physical page selector 410 as it may be implemented by an exemplary embodiment. Input to the physical page selector 410 is the data rate (the number of bits to be written to the memory device 430), denoted as $R_{data}$. In an exemplary embodiment, the data rate is received into the physical page selector 410 via a receiver 608 (e.g., to receive the data rate from another module such as the data compressor 414, to read the data rate from a storage location). Block 602 in the physical page selector 410 selects "m" pages (i.e., a "subgroup of candidate physical addresses of candidate memory pages) from the writable page cache 402. In an exemplary embodiment, this selection is done probabilistically with uniform probability over all pages in the writable page cache 402. In another embodiment, the writable page cache 402 is indexed by the number of free bits in each page, and only the "m" pages with a specified maximum number of free bits are selected. In another embodiment, the writable page cache 402 is large enough to cover all device pages, and all device pages are selected.

In an exemplary embodiment, the cache page tester block 604 uses the data rate, the statistical history 408, the free bits in each candidate page (e.g., from the writable page cache 402), the number of writes on each candidate page (e.g., from the PPA-LPA map 418), and the number of valid pages/writes left in each candidate page block (e.g., from the block map 404) in order to select the page to be re-written. In an exemplary embodiment, the page selected is simply the page with the largest number of free bits. In another exemplary embodiment, the statistical history 408 is used to determine whether the page should be written on to a page with few free bits (which may not be usable for other pages), or a large number of free bits (which would in general help with endurance). For example, two types of data may be defined: those with a data rate greater than R1 bits, and those with a data rate lower than R1 bits. Similarly, two types of invalid pages may be defined: those with a number of free bits greater than R2 bits, and those with a number of free bits lower than R2 bits. Then, if the data rate is greater than R1, it is written to a page which has more than R2 free bits, otherwise it is written to a page with less than R2 free bits. In another embodiment, a page is not selected if the number of writes on the page, or the total number of writes in the block (indicating disturbance levels) exceed certain pre-specified thresholds.

Once a candidate page is selected from the invalid pages, the number of free bits is compared to the data rate at the comparator block 606. If the number of free bits is larger than the data rate, the cache page address is output, $R_{cache}$. If the number of free bits is smaller than the data rate, a free page is selected and its address, $R_{free}$, is output. In an alternate exemplary embodiment, more than one attempt is made to find an invalid page prior to selecting a free page. In an exemplary embodiment the output is via a transmitter 610 (e.g., to transmit address to another module such as the device writer 416, to store the address at a storage location).

In an exemplary embodiment, the physical page selector 410 attempts to find a rewritable page (i.e., an invalid page) for a given compressed data rate, $R_{data}$, such that $R_{free}$ (the number of free bits in the invalid page) is greater than $R_{data}$. The larger the $R_{free}$, the smaller the additional programming wear that will be required by the rewrite.

In an exemplary embodiment, the physical page selector 410 uses the "writes" column in the PPA-LPA map 418 to locate and select pages for rewriting that have been written to fewer times than a threshold number of times (e.g., five) in order to decrease any additional wordline (and other) disturbances caused by the rewrite to the page.

In an exemplary embodiment, the physical page selector 410 uses the "writes left" column in the block map 404 to locate and select pages for rewriting from blocks that have been written less than a threshold number of times (e.g., one-hundred) in order to decrease any additional bitline and other disturbances caused by the rewrite to the page.

In an exemplary embodiment, the number of page writes in the PPA-LPA map is tracked by probabilistic counters. Whenever a given PPA is written, the write counter increments with a probability which is lesser than 1 (e.g. one-sixteenth). This reduces the amount of memory required to track the number of writes for each PPA.

In an exemplary embodiment, the writable page cache 402 is searched to find a rewritable page. In an exemplary embodiment search latency is reduced by searching through "m" probabilistically selected pages in the writable page cache 402. In an exemplary embodiment, updates to the writable page cache 402 are expedited through periodic (e.g., hourly, daily) data collection and/or during system down time/non-peak usage times. In an exemplary embodiment, a content addressable memory (CAM) is used to store and search the writable page cache 402.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A memory system comprising:
   a receiver for receiving a data rate of a data sequence to be written to a non-volatile memory device, the data rate specifying a number of bits in the data sequence;
   a physical page selector for:
   selecting a physical address of an invalid previously written memory page from a group of physical addresses of invalid previously written memory pages located on the non-volatile memory device, the invalid previously written memory page at the selected physical address having a number of free bits; and
   determining if the number of free bits is greater than or equal to the data rate; and
   a transmitter for outputting the selected physical address of the invalid previously written memory page in response to the physical page selector determining that the number of free bits is greater than or equal to the data rate.

2. The memory system of claim 1, wherein the non-volatile memory device is a not-and (NAND) flash memory device.

3. The memory system of claim 1, wherein the transmitter is further for outputting a physical address of an erased memory page located on the non-volatile memory device in response to the physical page selector determining that the number of free bits is less than the data rate.

4. The memory system of claim 1, wherein the selecting is from a subset of the group of physical addresses.

5. The memory system of claim 1, wherein the selecting the physical address of an invalid previously written memory page comprises:
   selecting a subgroup of the physical addresses from the group of physical addresses, the subgroup comprising candidate physical addresses of candidate pages;
   selecting a candidate physical address of a candidate page as the physical address of the invalid previously written memory page, the selecting responsive to one or more of a number of free bits in the candidate page, a number of previous writes to the candidate page, a number of previous writes to a block containing the candidate page, a statistical history of past compression rates, and the received data rate.

6. The memory system of claim 5, wherein the subgroup is selected probabilistically from the group of physical addresses, wherein a probability of a physical address of an invalid previously written memory page from the group being selected as a candidate physical address of a candidate page in the subgroup is a function of a number of free bits in the invalid previously written memory page at the physical address.

7. The memory system of claim 1, further comprising:
   a multi-write code selector for selecting a multi-write code in response to the number of free bits and to the data rate; and
   a device writer for writing the data sequence to the invalid previously written memory page at the selected physical address.

8. The memory system of claim 1, wherein the group of physical addresses is expanded by adding a new physical address of an invalid previously written memory page, the new physical address selected in response to a number of free bits in the invalid previously written memory page at the new physical address, a number of times that the invalid previously written memory page at the new physical address has been rewritten without an erase, current contents of the group of physical addresses, and a number of valid pages in a block containing the new invalid previously written memory page.

9. The memory system of claim 1, wherein one of the physical addresses of invalid previously written memory pages in the group of physical addresses is removed from the group, the removed physical address selected in response to a number of free bits in the invalid previously written memory page at the removed physical address, a number of times the invalid previously written memory page at the removed physical address has been rewritten without an erase, current contents of the group, and a number of valid pages in a block containing the invalid previously written memory page at the removed physical address.

10. A computer implemented method for selecting a physical page to write to in a memory system, the method comprising:
receiving a data rate of a data sequence to be written to a non-volatile memory device, the data rate specifying a number of bits in the data sequence;
selecting a physical address of an invalid previously written memory page from a group of physical addresses of invalid previously written memory pages located on the non-volatile memory device, the invalid previously written memory page at the selected physical address having a number of free bits; and
determining if the number of free bits is greater than or equal to the data rate; and
outputting the selected physical address of the invalid previously written memory page in response to determining that that the number of free bits is greater than or equal to the data rate.

11. The method of claim 10, wherein the non-volatile memory device is a not-and (NAND) flash memory device.

12. The method of claim 10, further comprising outputting a physical address of an erased memory page located on the non-volatile memory device in response to determining that the number of free bits is less than the data rate.

13. The method of claim 10, wherein the selecting is from a subset of the group of physical addresses.

14. The method of claim 10, wherein the selecting the physical address of the invalid previously written memory page comprises:
selecting a subgroup of the physical addresses from the group of physical addresses, the subgroup comprising candidate physical addresses of candidate pages;
selecting a candidate physical address of a candidate page as the physical address of the invalid previously written memory page, the selecting responsive to one or more of a specified number of free bits in the candidate page, a number of previous writes to the candidate page, a number of previous writes to a block containing the candidate page, a statistical history of past compression rates, and the received data rate.

15. The method of claim 10, further comprising:
selecting a multi-write code in response to the number of free bits and to the data rate; and
writing the data sequence to the invalid previously written memory page at the selected physical address.

16. A computer implemented method for erasing memory blocks in a memory system, the method comprising:
receiving a block erasure request specifying a rewritable not-and (NAND) flash memory device, the rewritable NAND flash memory device comprising one or more memory blocks that are candidates for erasure;
selecting a memory block to be erased, the selecting from the one or more memory blocks that are candidates for erasure, the selecting responsive to a number of memory pages containing valid data in a candidate memory block, to a number of free bits in the candidate memory block, and to a number of writes left in the candidate memory block; and
initiating an erasure of the selected memory block.

17. The method of claim 16 further comprising:
receiving notification that the erasure of the selected memory block has been completed; and
updating control information utilized to perform multiple writes to pages in the rewritable NAND flash memory device to reflect the erasure of the selected memory block.

18. The method of claim 16, wherein the block erasure request is generated in response to the memory system being in a non-busy state.

19. The method of claim 16, wherein the block erasure request is generated in response to a number of memory blocks in a free pool falling below a threshold.

20. The method of claim 16, wherein the selecting is further responsive to an amount of time that the candidate memory block has been a candidate for erasure.

21. The method of claim 16, wherein the selecting is further responsive to spatial and temporal characteristics of any logical write memory page addresses corresponding to the candidate memory block.

22. The method of claim 16, wherein the selecting is further responsive to at least one of a total number of writes that have been performed to the candidate memory block and to an estimate number of bits that would need to be written if the candidate memory block is erased.

23. A memory system comprising:
a receiver for receiving a data sequence to be written to a non-volatile memory device, and for receiving a logical address associated with the data sequence;
a physical page selector for selecting a physical page on the non-volatile memory device to be written with the data sequence, the selected physical page having a number of free bits;
a multi-write code selector for selecting a write code in response to the number of free bits in the selected physical page and to the data sequence; and
a device writer for reading contents of the selected physical page, generating a write sequence that is consistent with the contents of the selected physical page, and writing the write sequence to the selected physical page, the reading, generating and writing performed in response to the selected physical page being a previously written memory page.

24. The system of claim 23, wherein the non-volatile memory device is a not-and (NAND) flash memory device.

25. The system of claim 23, further comprising:
a garbage collector processor; and
a garbage collection process executable by the garbage collector processor, the garbage collection process capable of performing a method comprising
receiving a block erasure request specifying a non-volatile memory device, the non-volatile memory device comprising one or more memory blocks that are candidates for erasure;
selecting a memory block to be erased from the one or more memory blocks that are candidates for erasure, the selecting responsive to a number of memory pages containing valid data in a candidate memory block, to a number of free bits in the candidate memory block, and to a number of writes left in the candidate memory block; and
initiating an erasure of the selected memory block.

* * * * *